(12) United States Patent
Sharma et al.

(10) Patent No.: US 11,021,952 B2
(45) Date of Patent: *Jun. 1, 2021

(54) FORMATION PRESSURE TESTING

(71) Applicant: Schlumberger Technology Corporation, Sugar Land, TX (US)

(72) Inventors: Arun Sharma, Haridabad (IN); Tudor Ioan Palaghita, Houston, TX (US); Ashers Partouche, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/927,035

(22) Filed: Jul. 13, 2020

(65) Prior Publication Data

US 2020/0340358 A1  Oct. 29, 2020

Related U.S. Application Data

(63) Continuation of application No. 15/837,242, filed on Dec. 11, 2017, now Pat. No. 10,711,608.

(60) Provisional application No. 62/435,926, filed on Dec. 19, 2016.

(51) Int. Cl.
| | | |
|---|---|---|
| *E21B 49/10* | (2006.01) | |
| *E21B 47/06* | (2012.01) | |
| *G01N 1/14* | (2006.01) | |
| *G01L 19/00* | (2006.01) | |
| *G01L 19/14* | (2006.01) | |
| *E21B 47/12* | (2012.01) | |
| *E21B 49/00* | (2006.01) | |
| *E21B 49/08* | (2006.01) | |

(52) U.S. Cl.
CPC ............ *E21B 49/10* (2013.01); *E21B 47/06* (2013.01); *G01L 19/0007* (2013.01); *G01L 19/144* (2013.01); *G01N 1/14* (2013.01); *E21B 47/12* (2013.01); *E21B 49/00* (2013.01); *E21B 49/0875* (2020.05); *G01N 2001/1427* (2013.01)

(58) Field of Classification Search
CPC ..... E21B 47/06; E21B 49/10; G01L 19/0007; G01L 19/144; G01N 1/14
See application file for complete search history.

(56) References Cited

U.S. PATENT DOCUMENTS

| | | |
|---|---|---|
| 3,565,169 A | 2/1971 | Bell |
| 3,653,436 A | 4/1972 | Anderson |
| 3,859,850 A | 1/1975 | Whitten et al. |
| 4,860,581 A | 8/1989 | Zimmerman et al. |
| 4,936,139 A | 6/1990 | Zimmerman et al. |
| 5,377,755 A | 1/1995 | Michaels et al. |

(Continued)

*Primary Examiner* — John Fitzgerald
(74) *Attorney, Agent, or Firm* — Trevor G. Grove

(57) ABSTRACT

A pressure testing module separable from and configured to be coupled with a tool base that is to be coupled along a downhole tool string to be conveyed within a wellbore extending into a subterranean formation. The pressure testing module includes a chamber and a piston assembly slidably disposed within the chamber, thus dividing the chamber into a first chamber portion and a second chamber portion. The piston assembly is operable to move in response to hydraulic fluid being pumped into the first chamber portion and to draw formation fluid of the wellbore into the second chamber portion in response to the movement of the piston assembly.

20 Claims, 8 Drawing Sheets

(56) References Cited

U.S. PATENT DOCUMENTS

| | | |
|---|---|---|
| 6,688,390 B2 | 2/2004 | Bolze et al. |
| 7,581,440 B2 | 9/2009 | Meek et al. |
| 7,779,684 B2 | 8/2010 | Meek et al. |
| 7,938,199 B2 | 5/2011 | Welshans et al. |
| 8,408,298 B2 | 4/2013 | Briquet et al. |
| 10,539,015 B2 | 1/2020 | Nguyen-Thuyet |
| 10,711,608 B2* | 7/2020 | Sharma ................. E21B 49/082 |
| 10,753,172 B2* | 8/2020 | Tao ......................... E21B 34/10 |
| 2008/0115574 A1 | 5/2008 | Meek |
| 2008/0115575 A1 | 5/2008 | Meek et al. |
| 2009/0158837 A1 | 6/2009 | Meek et al. |
| 2009/0211756 A1 | 8/2009 | Goodwin et al. |
| 2011/0220412 A1 | 9/2011 | Villareal et al. |
| 2013/0025855 A1 | 1/2013 | Glattetre et al. |
| 2013/0081803 A1 | 4/2013 | Tao et al. |
| 2015/0053393 A1 | 2/2015 | Ortiz et al. |
| 2015/0107852 A1 | 4/2015 | Southgate et al. |
| 2015/0285043 A1 | 10/2015 | Airey et al. |
| 2017/0074095 A1 | 3/2017 | Nguyen-Thuyet |
| 2018/0171790 A1 | 6/2018 | Sharma et al. |
| 2018/0355716 A1 | 12/2018 | Villareal et al. |
| 2019/0271227 A1 | 9/2019 | Peters et al. |
| 2019/0330945 A1* | 10/2019 | Rosenthal ............... E21B 23/06 |
| 2020/0141234 A1* | 5/2020 | Ventre .................... E21B 47/06 |
| 2020/0248549 A1* | 8/2020 | Gisolf .................... E21B 49/08 |

\* cited by examiner

FORMATION PRESSURE TESTING

CROSS-REFERENCES TO RELATED APPLICATIONS

This application is a continuation application of U.S. patent application Ser. No. 15/837,242 that was filed on Dec. 11, 2017, and is entitled "Formation Pressure Testing," which claimed priority to U.S. Provisional Patent Application No. 62/435,926, filed on Dec. 19, 2016, now U.S. Pat. No. 10,711,608. The entirety of the foregoing applications are incorporated herein by reference.

BACKGROUND OF THE DISCLOSURE

Wells are generally drilled into the ground or ocean bed to recover natural deposits of oil, gas, and other natural resources that are trapped in subsurface rock formations. Such wells are drilled using a drill bit attached to the lower end of a drill string. Drilling fluid is pumped from the wellsite surface down through the drill string to the drill bit. The drilling fluid lubricates and cools the bit, and may additionally carry drill cuttings from the wellbore back to the surface.

In various oil and gas exploration operations, it may be beneficial to have information about the subsurface formations that are penetrated by the wellbore. Accordingly, certain formation testing operations may be performed to measure and analyze formation fluid pressure and/or composition of the formation and the formation fluid. Such tests may include extracting a sample of the formation fluid from the formation, cutting a sample of the rock formation, and analyzing the samples. These tests may be useful for predicting the production capacity and production lifetime of the subsurface formation.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a fluid testing tool to be coupled along a downhole tool string to convey within a wellbore extending into a subterranean formation. The fluid testing tool includes a tool base and a pressure testing module. The tool base is to be coupled along the downhole tool string and includes a hydraulic pump and a probe assembly operable to engage a sidewall of the wellbore and receive formation fluid from the subterranean formation. The pressure testing module is detachably coupled with the tool base and includes a chamber and a piston assembly. The piston assembly is slidably disposed within the chamber, thus dividing the chamber into a first chamber portion and a second chamber portion. The hydraulic pump is fluidly connected to the first chamber portion and is operable to pump hydraulic fluid into the first chamber portion to move the piston assembly to draw the formation fluid into the second chamber portion.

The present disclosure also introduces a method including coupling a pressure testing module with a tool base to assemble a fluid testing tool. The pressure testing module is separable from the tool base. The method also includes coupling the tool base along a downhole tool string to couple the fluid testing tool along the downhole tool string, conveying the downhole tool string within a wellbore extending from a wellsite surface, and operating the fluid testing tool to draw formation fluid into the pressure testing module and record pressure of the formation fluid.

The present disclosure also introduces an apparatus including a pressure testing module and a tool base. The pressure testing module comprising includes a first chamber with a first piston assembly slidably disposed within the first chamber, thus dividing the first chamber into a first chamber portion and a second chamber portion. The pressure testing module also includes a second chamber with a second piston assembly slidably disposed within the second chamber, thus dividing the second chamber into a third chamber portion and a fourth chamber portion. The tool base is to be coupled along a downhole tool string to be conveyed within a wellbore extending into a subterranean formation. The pressure testing module is separable from and coupled to the tool base. The tool base includes a probe assembly operable to engage a sidewall of the wellbore and receive formation fluid from the subterranean formation. The tool base also includes a hydraulic pump operable to pump hydraulic fluid. The pressure testing module and the tool base are operable to selectively convey the hydraulic fluid pumped by the hydraulic pump (i) into the first chamber portion to move the first piston assembly to draw the formation fluid into the second chamber portion and (ii) into the third chamber portion to move the first piston assembly to draw the formation fluid into the fourth chamber portion.

The present disclosure also introduces a pressure testing module separable from and configured to be coupled with a tool base that is to be coupled along a downhole tool string to be conveyed within a wellbore extending into a subterranean formation. The pressure testing module includes a chamber and a piston assembly slidably disposed within the chamber, thus dividing the chamber into a first chamber portion and a second chamber portion. The piston assembly is operable to move in response to hydraulic fluid being pumped into the first chamber portion and to draw formation fluid of the wellbore into the second chamber portion in response to the movement of the piston assembly.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
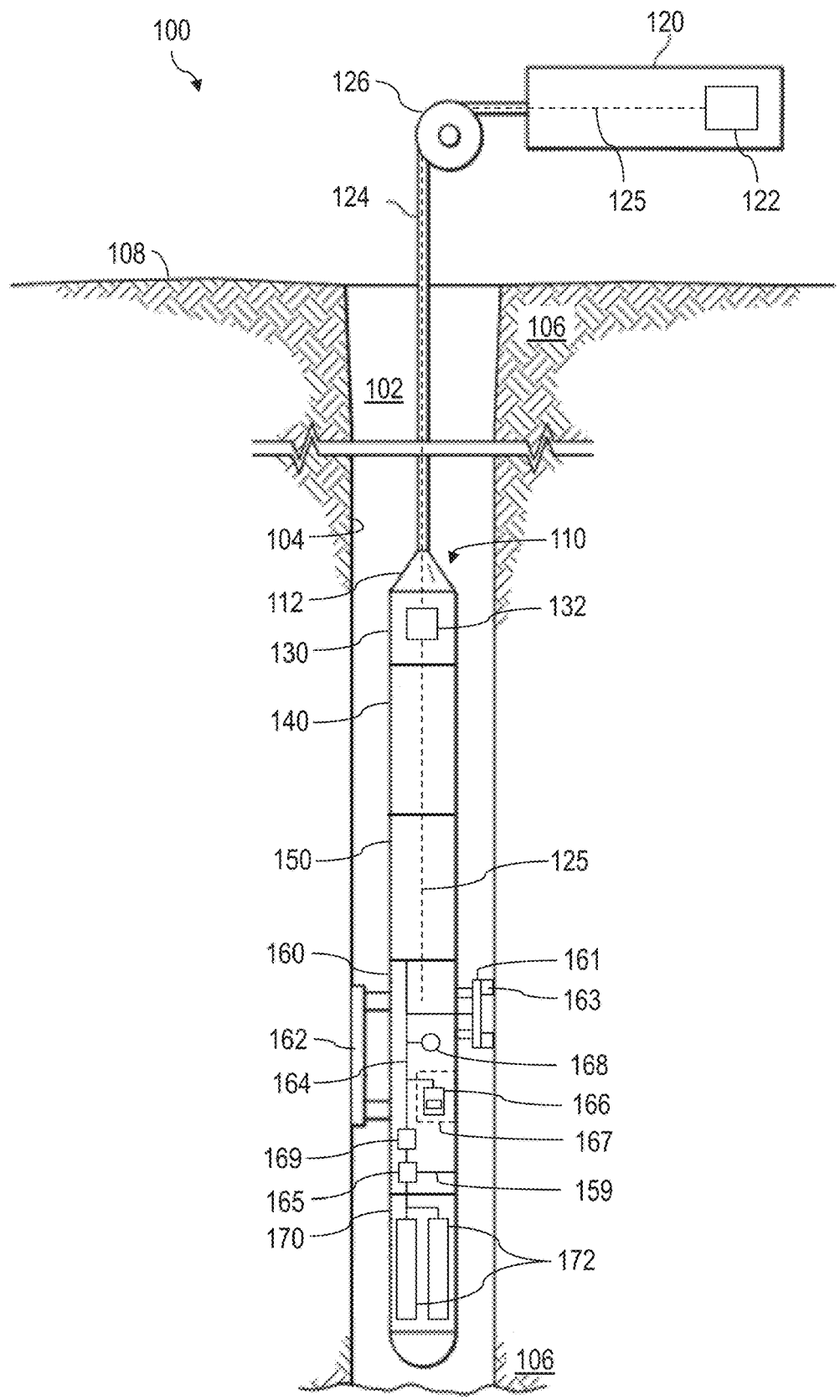
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of an example implementation of a wellsite system 100 to which one or more aspects of the present disclosure may be applicable. The wellsite system 100, which may be situated onshore or offshore, comprises a downhole tool string 110 operable for engaging a portion of a sidewall 104 of a wellbore 102 penetrating a subterranean formation 106. The downhole tool string 110 may be suspended in the wellbore 102 from a lower end of a conveyance means 124, such as a wireline, a slickline, an e-line, coiled tubing, production tubing, and/or other conveyance means, operably coupled with a tensioning device 126 disposed at a wellsite surface 108. The tensioning device 126 may be, comprise, or form at least a portion of a crane, a winch, a drawworks, a top drive, and/or another conveyance device coupled to the downhole tool string 110 by the conveyance means 124.

A multi-conductor cable, hereinafter referred to as a conductor 125, may extend through the conveyance means 124 and at least partially within the downhole tool string 110 and surface equipment 120. The conductor 125 may facilitate electrical and/or optical communication between one or more components of the surface equipment 120, including an uphole processing system 122 (e.g., a controller) and one or more portions of the downhole tool string 110, including a downhole processing system 132 (e.g., a controller). The conductor 125 may permit electrical power transfer and/or signal communication between the surface equipment 120 and the downhole tool string 110. The uphole processing system 122 may comprise an interface for receiving commands from a human operator and may be operable to store programs or instructions, including for implementing one or more aspects of the methods described herein.

The downhole tool string 110 may be or comprise one or more downhole tools, subs, modules, and/or other apparatuses operable in wireline, coiled tubing, completion, production, and/or other operations. For example, the downhole tool string 110 may comprise a cable head 112, a telemetry tool 130, a power supply tool 140, a formation fluid testing tool 160, and a sample containment tool 170. The downhole tool string 110 may also comprise one or more additional components or subs, such as additional tool 150, at various locations along the downhole tool string 110, each of which may perform various functions while performing downhole operations within the scope of the present disclosure. For example, the downhole tool string 110 may further comprise one or more of an additional sample containment tool, an acoustic tool, a density tool, an electromagnetic (EM) tool, a formation evaluation tool, a gravity tool, a formation logging tool, a magnetic resonance tool, a monitoring tool, a neutron tool, a nuclear tool, a photoelectric factor tool, a porosity tool, a reservoir characterization tool, a resistivity tool, a seismic tool, a fluid sampling tool, a coring tool, a surveying tool, a release tool, an anchor tool, a mechanical interface tool, a perforating tool, a cutting tool, a rotary actuator, a stroker tool, a downhole tractor, a jarring tool, an impact or impulse tool, a fishing tool, a valve key or engagement tool, and a plug setting tool, among other examples.

Each of the telemetry tool 130, the power supply tool 140, the additional tools 150, the formation fluid testing tool 160, and the sample containment tool 170 may convey or comprise a portion of the conductor 125 extending through the downhole tool string 110. The conductor 125 may include various electrical and/or optical connectors or interfaces (not shown), such as may facilitate connection between the conductor 125 and one or more of the tools 130, 140, 150, 160, 170 to permit communication between one or more of the tools 130, 140, 150, 160, 170 and one or more component of the surface equipment 120, including the uphole processing system 122. For example, the conductor 125 may be operable to transfer electrical power, data, and/or control signals between the surface equipment 120 and one or more of the tools 130, 140, 150, 160, 170.

The cable head 112 may be operable to connect the conveyance means 124 with the downhole tool string 110. The telemetry tool 130 may facilitate positioning of the downhole tool string 110 along the wellbore 102 and communication with the surface equipment 120. The telemetry tool 130 may comprise the downhole processing system 132 communicatively coupled with the surface equipment 114, including the uphole processing system 122, via the conductor 125. The downhole processing system 132 may comprise a circuit board and/or various electronic components for controlling operational aspects of the downhole tool string 110, and may have an interface for receiving commands from the human operator. The downhole processing system 132 may also store programs or instructions, including for implementing one or more aspects of the methods described herein. The uphole processing system 122 and/or the downhole processing system 132 may operate independently or cooperatively to control one or more portions of the tools 130, 140, 150, 160, 170. The uphole processing system 122 and/or the downhole processing system 132 may also analyze and/or process data obtained from various sensors disposed within or making up the tools 130, 140, 150, 160, 170, store measurements and/or processed data, and/or communicate the measurements and/or processed data to the surface equipment 120 for subsequent analysis.

The power supply tool 140 may be or comprise an electrical power source or a hydraulic power source. The electrical power source may comprise a battery (not shown), while the hydraulic power source may comprise a hydraulic fluid containment chamber and a hydraulic fluid pump (not shown), such as may be operable to selectively actuate or power portions of the downhole tool string 110, including the formation fluid testing tool 160.

The formation fluid testing tool 160 may be operable to extract, receive, or otherwise collect a formation fluid sample and/or test one or more properties of the formation fluid, including temperature, pressure, density, viscosity, porosity, and composition, among other examples. The formation fluid testing tool 160 may comprise a probe assembly 161 and an anchoring member 162 that are each selectively extendable and are respectively arranged on opposing sides. The probe assembly 161 and the anchoring member 162 may be operatively connected with and powered by the power supply tool 140. During downhole conveyance or prior to the fluid testing operations, the probe assembly 161 and the anchoring member 162 may be in a retracted state (not shown). When the downhole tool string 110 is conveyed to an intended test position along the wellbore 102, the probe assembly 161 and the anchoring member 162 may extend to engage the sidewall 104, as shown in FIG. 1.

The probe assembly 161 may be operable to engage the sidewall 104 of the wellbore 102 to selectively seal off or isolate a portion of the sidewall 104. For example, the probe assembly 161 may comprise a sealing pad 163 that may be urged against the sidewall 104 in a sealing manner to prevent movement of formation fluid into or out of the subterranean formation 106 other than through the probe assembly 161. The probe assembly 161 may comprise one or more sensors (not shown) adjacent the sealing pad 163, among other possible locations. The sensors may be utilized in the determination of petrophysical parameters of a portion of the subterranean formation 106 proximate the probe assembly 161. For example, the sensors may be utilized to measure or detect one or more of temperature, composition, electric resistivity, dielectric constant, magnetic resonance relaxation time, nuclear radiation, and/or combinations thereof, although other types of sensors are also within the scope of the present disclosure.

The formation fluid extracted via the probe assembly 161 may be directed into and through the formation fluid testing tool 160 via a flow line 164, which may be fluidly connected with other tools located above and/or below the formation fluid testing tool 160. A drawdown chamber 166 containing a piston may be fluidly connected with the flow line 164 and operable to draw therein the formation fluid from the subterranean formation 106 during pressure testing or pretest operations. A pressure sensor 168 may be fluidly connected with the flow line 164. The pressure sensor 168 may be operable to generate a signal indicative of the pressure along the flow line 164 and/or within the drawdown chamber 166, such as may be utilized to monitor or record the pressure along the flow line 164 and/or within the drawdown chamber 166 during the pressure testing operations. The drawdown chamber 166 may be disposed within or form at least a portion of a pressure testing module 167, such as may be selectively installed within or removed from the remaining portion or tool base of the formation fluid testing tool 160.

The formation fluid testing tool 160 may further comprise a pump 165 fluidly connected with or along the flow line 164. The pump 165 may be operable to selectively extract the formation fluid from the subterranean formation 106 and transfer the formation fluid to the sample containment tool 170, the additional tool 150, and/or other tools located above or below the formation fluid testing tool 160. Prior to performing the pressure testing operations, the formation fluid sampling operations, or other formation fluid testing operations, the pump 165 may also expel the formation fluid into the wellbore 102 via a port 159 during a "clean-up" operation until the formation fluid extracted from the subterranean formation 106 reaches a sufficiently low contamination level, at which time the formation fluid testing operations may be performed. The formation fluid testing tool 160 may also comprise a fluid sensing unit 169 through which the obtained formation fluid may be transmitted, such as to measure properties and/or composition of the sampled fluid. For example, the fluid sensing unit 169 may comprise one or more of a spectrometer, a fluorescence sensor, an optical fluid analyzer, a density and/or viscosity sensor, a pressure sensor, and/or a temperature sensor, among other examples.

The sample containment tool 170 may contain one or more detachable sample containers 172 (e.g., bottles) disposed or installed within the sample containment tool 170. The detachable sample containers 172 may receive and store the captured formation fluid for subsequent testing at the wellsite surface 108. The detachable sample containers 172 may be certified for highway and/or other transportation. The detachable sample containers 172 may be fluidly connected with the flow line 164, which may extend at least partially through the sample containment tool 170 to permit the pump 165 to transfer the formation fluid from the subterranean formation 106 into the detachable sample containers 172.

Figure 2:
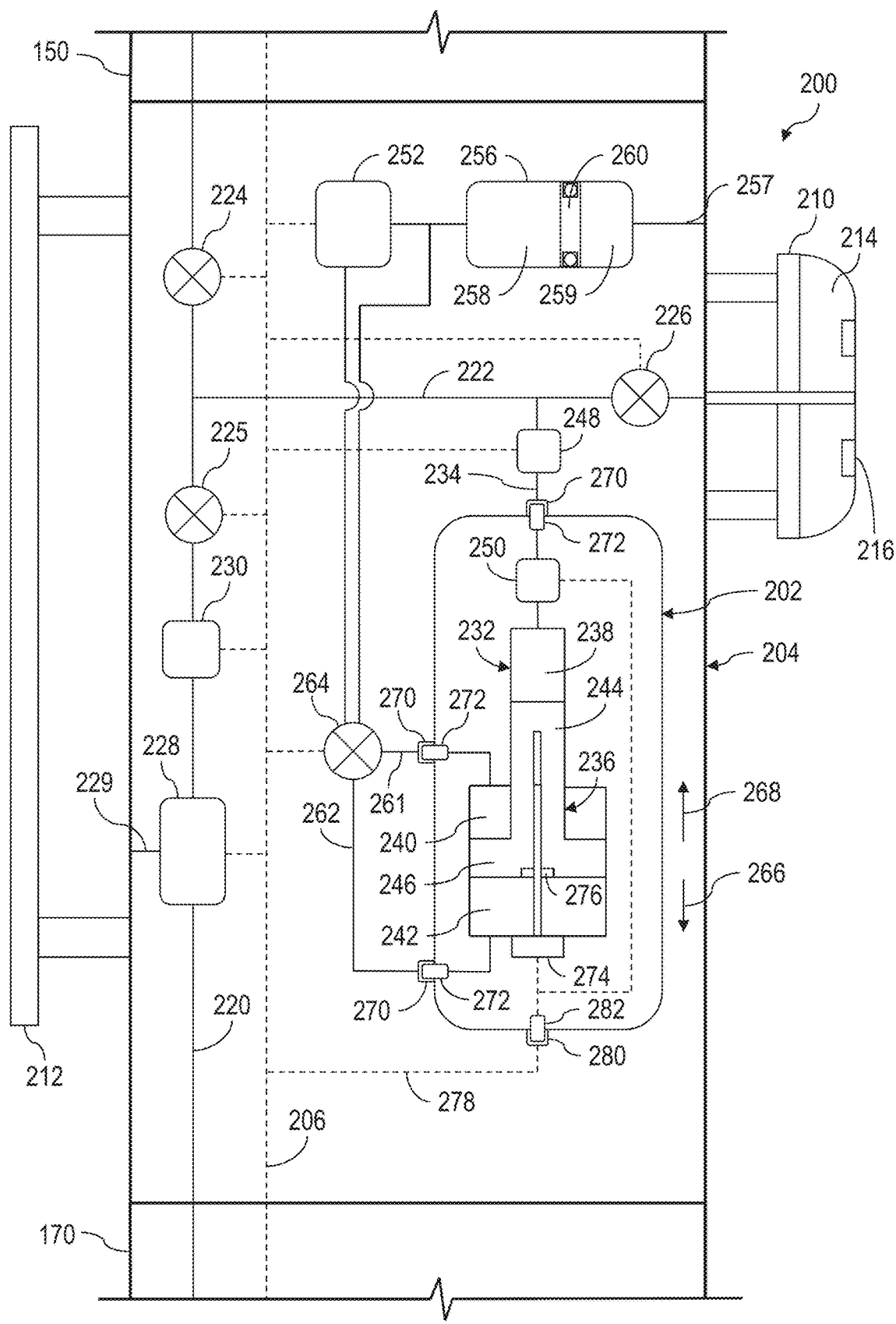
FIG. 2 is a schematic view of at least a portion of an example implementation of apparatus according to one or more aspects of the present disclosure.

FIG. 2 is a schematic view of at least a portion of an example implementation of a formation fluid testing tool 200, which may correspond to the formation fluid testing tool 160 shown in FIG. 1, according to one or more aspects of the present disclosure. The formation fluid testing tool 200 may comprise one or more similar features of the formation fluid testing tool 160, as described below.

Similar to as described above, the formation fluid testing tool 200 may be or comprise a tool operable to extract, receive, or otherwise collect a formation fluid sample and/or test one or more properties of the formation fluid, including temperature, pressure, density, viscosity, porosity, and composition, among other examples. The formation fluid testing tool 200 may comprise a pressure testing module 202, such as may be operable to or utilized for detecting pressure of the formation fluid within the subterranean formation 106. The pressure testing module 202 may be selectively installed within and removed from a tool base 204 of the formation fluid testing tool 200, e.g., while the formation fluid testing tool 200 is deployed in the field at the wellsite, thereby permitting selection and installation of pressure testing modules 202 having different structures and/or modes of operation to change the mode of operation of the formation fluid testing tool 200 while utilizing the same tool base 204. As described below, the pressure testing module 202 may be selected based on intended operation of the formation fluid testing tool 200 and/or downhole conditions within the wellbore 102.

The tool base 204 may comprise a probe assembly 210 and an anchoring member 212 that are each selectively extendable and are respectively arranged on opposing sides of the tool base 204. The probe assembly 210 and the anchoring member 212 may be operatively connected with and powered by the power supply tool 140. During downhole conveyance or prior to the fluid testing operations, the probe assembly 210 and the anchoring member 212 may be in a retracted state (not shown). When the downhole tool string 110 is located at an intended test position along the wellbore 102, the probe assembly 210 and the anchoring member 212 may extend to engage the sidewall 104.

The probe assembly 210 may be operable to engage the sidewall 104 of the wellbore 102 to selectively seal off or isolate a portion of the sidewall 104. For example, the probe assembly 210 may comprise a sealing pad 214 that may be urged against the sidewall 104 in a sealing manner to prevent movement of formation fluid into or out of the subterranean formation 106 other than through the probe assembly 210. The probe assembly 210 may comprise one or more sensors 216 adjacent the sealing pad 214, among other possible locations. The sensors 216 may be utilized in the determination of petrophysical parameters of a portion of the subterranean formation 106 proximate the probe assembly 210. For example, the sensors 216 may be utilized to measure or detect one or more of temperature, composition, electric resistivity, dielectric constant, magnetic resonance relaxation time, nuclear radiation, and/or combinations thereof, although other types of sensors are also within the scope of the present disclosure.

The tool base 204 may further comprise various fluid conduits and valves utilized to selectively control flow of the formation fluid. For example, the probe assembly 210 may be fluidly connected with a flow line 220 via a fluid conduit 222, such as may permit transfer of the formation fluid along the fluid conduit 222 and into the flow line 220. The flow line 220 may extend through the formation fluid testing tool 200 and fluidly connect with the tools 150, 170 located above and/or below the formation fluid testing tool 200, such as may permit transfer of the formation fluid into and/or between the tools 150, 170. One or more fluid valves 224, 225, 226 may be fluidly connected along the flow line 220 and the fluid conduit 222 to selectively control the flow of formation fluid into the pressure testing module 202 and/or toward the tools 150, 170. The fluid valves 224, 225, 226 may be or comprise ball valves, globe valves, butterfly valves, and/or other types of fluid valves, such as may be selectively opened and closed to permit and prevent fluid flow. Each fluid valve 224, 225, 226 may be actuated remotely by a corresponding actuator (not shown), such as a solenoid, motor, or other electric actuator, or a fluid actuator, such as a hydraulic cylinder or rotary actuator.

The tool base 204 may further comprise a pump 228 fluidly connected with or along the flow line 220. The pump 228 may be operable to selectively extract the formation fluid from the subterranean formation 106 and transfer the formation fluid toward the tools 150, 170. Prior to the testing operations, the pump 228 may expel the formation fluid into the wellbore 102 through a port 229 during the clean-up operation until the formation fluid extracted from the subterranean formation 106 reaches a sufficiently low contamination level, at which time the formation fluid testing operations may be performed. The formation fluid testing tool 200 may also comprise a fluid sensing unit 230 through which the formation fluid may be transmitted, such as to measure properties and/or composition data of the sampled formation fluid. For example, the fluid sensing unit 230 may comprise one or more of a spectrometer, a fluorescence sensor, an optical fluid analyzer, a density and/or viscosity sensor, a pressure sensor, and/or a temperature sensor, among other examples.

The pressure testing module 202 may comprise a drawdown chamber 232 fluidly connected with the fluid conduit 222 via a fluid conduit 234. The drawdown chamber 232 may contain therein a piston assembly 236 ("drawdown piston") slidably disposed within the drawdown chamber 232 and dividing the drawdown chamber 232 into chamber portions 238, 240, 242. For example, the piston assembly 236 may comprise a smaller first piston 244 fluidly dividing the drawdown chamber 232 into the first chamber portion 238 and second chamber portion 240 and a larger second piston 246 fluidly isolating the second chamber portion 240 from the third chamber portion 242. The piston assembly 236 may be movable along the drawdown chamber 232 to draw the formation fluid into the first chamber portion 238 ("pretest chamber") via the probe assembly 210 and the fluid conduits 222, 234 during the pressure testing operations.

One or more fluid sensing units 248, 250 may be connected along the fluid conduit 234, such as may permit monitoring of one or more properties of the formation fluid being transferred into or located within the first chamber portion 238. The fluid sensing unit 248 may be located within the tool base 204, and the fluid sensing unit 250 may be located within the pressure testing module 202. The fluid sensing units 248, 250 may be operable to generate signals indicative of various fluid properties of the formation fluid within the fluid conduit 234 and the first chamber portion 238. Among other fluid properties, the fluid sensing units 248, 250 may be operable to determine and/or record pressure of the formation fluid. The fluid sensing units 248, 250 may comprise substantially the same or similar structure and/or mode of operation as the fluid sensing unit 230 described above.

The tool base 204 may further comprise a hydraulic pump 252 fluidly connected with a tank 256 containing therein a volume of hydraulic fluid 258. The tank 256 may supply the hydraulic fluid 258 to the hydraulic pump 252 and receive returning or used hydraulic fluid. The hydraulic fluid 258 may be pressure compensated with respect to wellbore pressure. For example, the tank 256 may be fluidly connected with the wellbore 102 via a port 257 and contain therein a piston 260 operable to equalize the hydraulic fluid pressure with the wellbore pressure while fluidly isolating the hydraulic fluid 258 from the wellbore fluid 259. The hydraulic pump 252 may be fluidly connected with one or both of the chamber portions 240, 242 via one or more fluid conduits 261, 262. A fluid valve 264 may be fluidly connected between the hydraulic pump 252 and the chamber portions 240, 242, such as may be operable to selectively direct pressurized hydraulic fluid 258 discharged by the hydraulic pump 252 into one of the chamber portions 240, 242 to move the piston assembly 236 along or within the drawdown chamber 232. For example, the valve 264 may be a fluid directional control valve operable to direct the hydraulic fluid 258 into the chamber portion 240 and out of the chamber portion 242 to retract the piston assembly 236 as indicated by arrow 266, or the valve 264 may be operable to direct the hydraulic fluid into the chamber portion 242 and out of the chamber portion 240 to extend the piston assembly 236 as indicated by arrow 268. The valve 264 may be actuated remotely by a corresponding actuator (not shown), such as a solenoid, motor, or other electric actuator, or a fluid actuator, such as a hydraulic cylinder or rotary actuator.

As described above, the formation fluid testing tool 200 may be utilized to perform formation pressure testing operations to determine and/or monitor the pressure of the formation fluid within the subterranean formation 106. For example, once a fluid seal is achieved between the probe assembly 210 and the sidewall 104 and, perhaps, after the clean-up operation is performed, the piston assembly 236 may be retracted within the drawdown chamber 232 as indicated by the arrow 266 to form or increase the volume of the first chamber portion 238 to create a pressure drop within the first chamber portion 238 and the fluid conduits 222, 234 below the formation pressure to draw the formation fluid into the first chamber portion 238. When the piston assembly 236 stops retracting, the formation fluid may continue to enter the first chamber portion 238 via the probe assembly 210 and the fluid conduits 222, 234 until the pressure of the formation fluid in the first chamber portion 238 is substantially equal to the pressure of the formation fluid within the subterranean formation 106. The pressure recorded by a pressure sensor of one or both of the fluid sensing units 248, 250 when the formation fluid stops flowing into the first chamber portion 238 may be the formation fluid pressure and/or may be indicative of the formation fluid pressure. To discharge the formation fluid out of the first chamber portion 238, the piston assembly 236 may be extended within the drawdown chamber 232 as indicated by the arrow 268. Such pressure testing operations may be repeated. During the pressure testing operations, the fluid valves 224, 225 may be in a closed-flow position preventing fluid flow along the flow line 220 and the fluid valve 226 may be in an open-flow position permitting fluid flow between the probe assembly 210 and the first chamber portion 238. Prior to or after the pressure testing operations, one or both of the fluid valves 224, 225 may be operated to the open-flow position to permit flow of the formation fluid toward the tools 150, 170.

The pressure testing module 202 and the tool base 204 may further comprise fluid couplings or connectors along the fluid conduits 234, 261, 262, such as may facilitate fluid connection between the pressure testing module 202 and the tool base 204. For example, the tool base 204 may comprise fluid connectors 270 (e.g., female connectors or receptacles) operable to receive and fluidly connect with corresponding fluid connectors 272 (e.g., male connectors or stabbers) of the pressure testing module 202, or in other examples, the pressure testing module 202 may comprise fluid connectors 270 operable to receive and fluidly connect with corresponding fluid connectors 272 of the tool base 204. The fluid connectors 270, 272 may permit installation and removal of the pressure testing module 202 into and from the tool base 204, such as may permit the transfer of the formation fluid and the hydraulic fluid as described above. The fluid connectors 270, 272 may permit "plug-and-play" fluid connection by simply mating the fluid connectors 270, 272 without utilizing specialized tools and, thus, permitting field removal and installation of the pressure testing module 202 without having to disconnect the tool base 204 of the formation fluid testing tool 200 from the tools 150, 170 adjacent to the formation fluid testing tool 200.

The pressure testing module 202 may further comprise one or more position sensors 274 (e.g., linear sensors) operable to generate a signal or information indicative of the axial position and/or velocity of the piston assembly 236 within the drawdown chamber 232, such as to monitor the position and/or velocity of the piston assembly 236 within or with respect to the drawdown chamber 232. The position sensor 274 may be disposed in association with the piston assembly 236 in a manner permitting sensing of the position and/or velocity of the piston assembly 236. The position and/or velocity signals generated by the position sensor 274 may be utilized to determine flow of the formation fluid into the first chamber portion 238 and/or volume ("pretest volume") of the formation fluid within the first chamber portion 238. For example, a portion of the position sensor 274 may extend axially into or partially through the piston assembly 236 to monitor relative position and/or velocity of a magnet or another marker 276 carried with the piston assembly 236. However, the pressure testing module 202 may comprise other linear position sensors operable to monitor the position and/or velocity of the piston assembly 236. For example, the position sensor 274 may be or comprise an echo sensor, a roller screw with a resolver or rotary encoder, a linear encoder, a linear potentiometer, a capacitive sensor, an inductive sensor, a magnetic sensor, a linear variable-differential transformer (LVDT), a proximity sensor, a Hall effect sensor, and/or a reed switch, among other examples.

A multi-conductor cable, hereinafter referred to as a conductor 206, may extend through the tool base 204 to communicatively connect the formation fluid testing tool 200 with the tools 150, 170 adjacent to the formation fluid testing tool 200. The conductor 206 may be or form a portion of the conductor 125 extending through the downhole tool string 110. The conductor 206 may include various electrical and/or optical connectors or interfaces (not shown), which may facilitate connection between the conductor 206 and the various components of the formation fluid testing tool 200 to permit communication between the various components of the formation fluid testing tool 200 and one or more component of the surface equipment 120, including the uphole processing system 122, and one or more components of the downhole tool string 110, including the downhole processing system 132. For example, the valves 224, 225, 226, the pumps 228, 252, the fluid sensing units 230, 248, 250, and the position sensor 274 may be communicatively connected with the conductor 206 via corresponding conductors (shown in FIG. 2 as dashed lines), such as may permit transfer electrical power, data, and/or control signals between, e.g., the surface equipment 120 and one or more of the valves 224, 225, 226, the pumps 228, 252, the fluid sensing units 230, 248, 250, and the position sensor 274.

The pressure testing module 202 and the tool base 204 may further comprise electrical couplings or connectors along an electrical conductor 278 extending between the fluid sensing unit 250, the position sensor 274, and the conductor 206. For example, the tool base 204 may comprise an electrical connector 280 (e.g., multi-pin female connector or receptacle) operable to receive and electrically connect with a corresponding electrical connector 282 (e.g., multi-pin male connector or plug) of the pressure testing module 202, or in some examples, the pressure testing module may comprise an electrical connector 280 operable to receive and electrically connect with a corresponding electrical connector 282 of the tool base 204. The electrical connectors 280, 282 may permit installation and removal of the pressure testing module 202 into and from the tool base 204, such as may permit signal communication described above. Similar to as described above, the electrical connectors 280, 282 may permit "plug-and-play" electrical connection by simply mating the electrical connectors 280, 282 without utilizing specialized tools and, thus, permitting field installation and removal of the pressure testing module 202.

Figure 3:
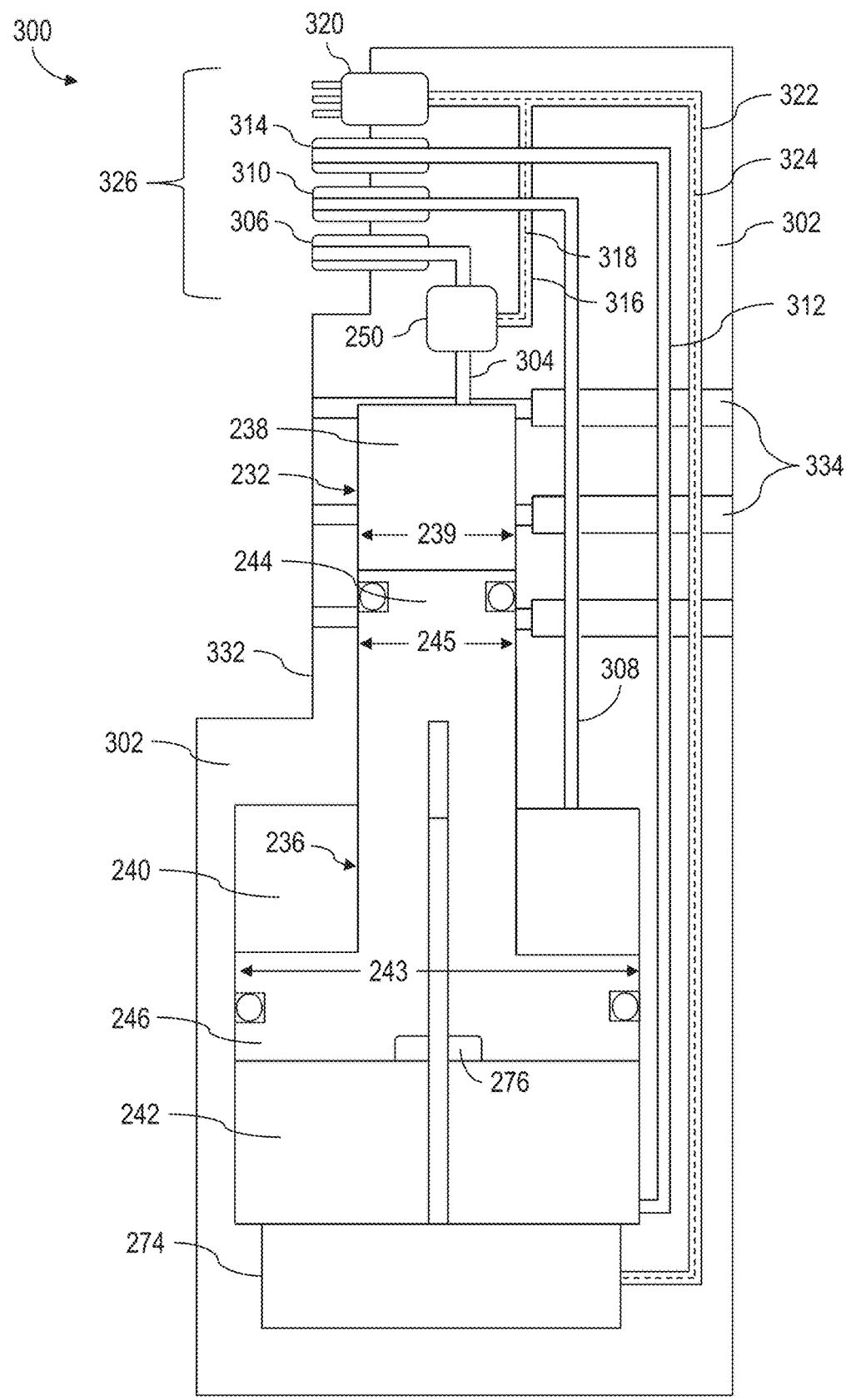
FIG. 3 is a sectional view of at least a portion of an example implementation of apparatus according to one or more aspects of the present disclosure.
Figure 4:
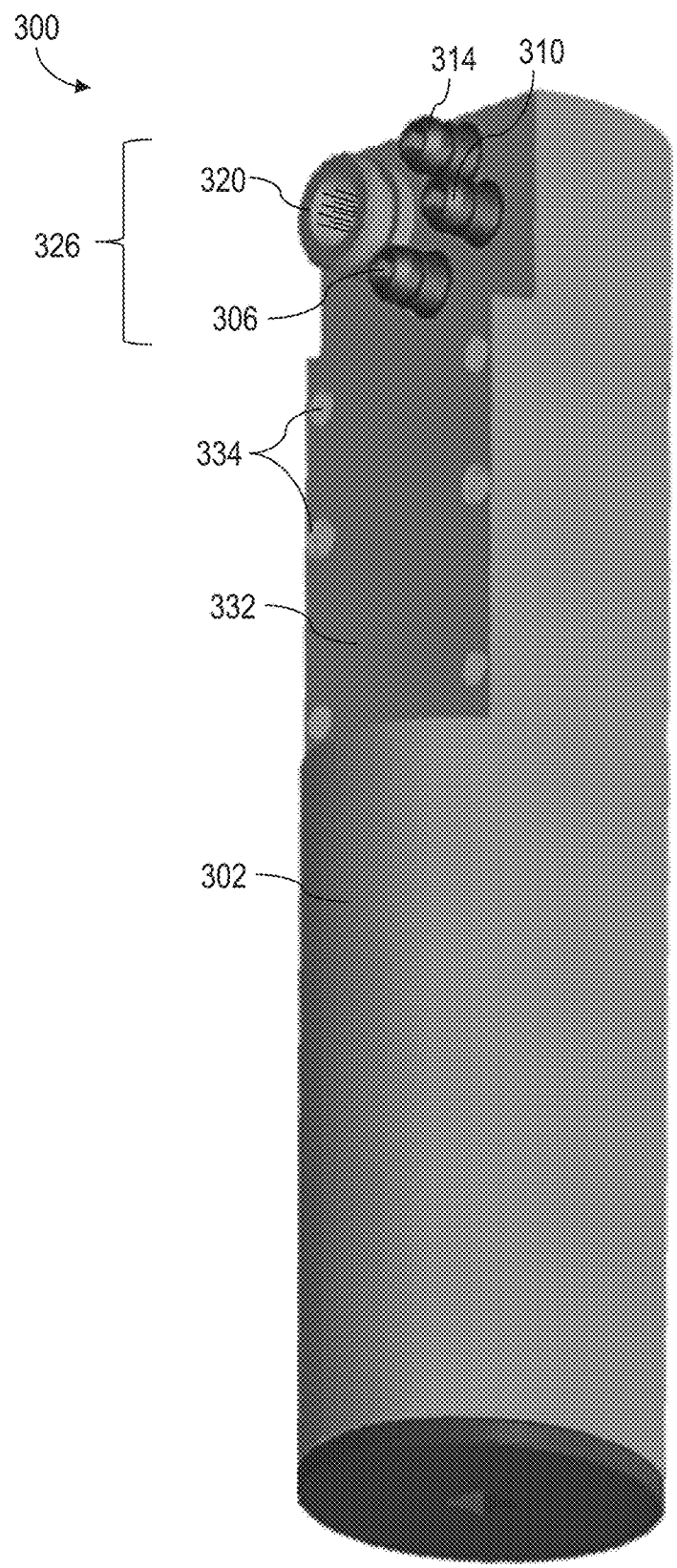
FIG. 4 is a perspective view of at least a portion of an example implementation of apparatus according to one or more aspects of the present disclosure.

FIGS. 3 and 4 are sectional and perspective views, respectively, of at least a portion of an example implementation of a pressure testing module 300, which may correspond to the pressure testing module 202 shown in FIG. 2, according to one or more aspects of the present disclosure. The pressure testing module 300 may comprise one or more similar features of the pressure testing module 202, including where indicated by like reference numbers as described below.

The pressure testing module 300 may comprise a module body 302 having a drawdown chamber 232 containing a piston assembly 236 and a plurality of fluid pathways 304, 308, 312 adapted to transfer the formation and hydraulic fluids between various portions of the drawdown chamber 232 and the tool base 204, as described above. The pressure testing module 300 may comprise the fluid pathway 304 extending between a first chamber portion 238 and a fluid connector 306. The pressure testing module 300 may further comprise the fluid pathway 308 extending between a second chamber portion 240 and a fluid connector 310, and the fluid pathway 312 extending between a third chamber portion 242 and a fluid connector 314.

The pressure testing module 300 may also comprise a plurality of bores or pathways 316, 322 operable to accommodate therethrough electrical conductors 318, 324. For example, the pressure testing module 300 may comprise the pathway 316 operable to accommodate therethrough the electrical conductor 318 extending between a fluid sensing unit 250 and an electrical connector 320, and the pathway 322 operable to accommodate therethrough an electrical conductor 324 extending between a position sensor 274 and the electrical connector 320. The fluid connectors 306, 310, 314 and electrical connector 320 may be grouped together or in close proximity to each other at a connection area 326.

The pressure testing module 300 may further comprise a plurality of openings 334 (e.g., bolt holes) extending laterally through the module body 302 to a mounting surface 332 of the pressure testing module 300.

FIG. 3 additionally illustrates a chamber portion diameter 239 of the first chamber portion 238 of the drawdown chamber 232, a piston diameter 245 of the first piston 244, and a piston diameter 243 of the second piston 246. The chamber portion diameter 239, the piston diameter 243, and the piston diameter 245 are perpendicular to the directional movement of the piston assembly 236.

Figure 5:
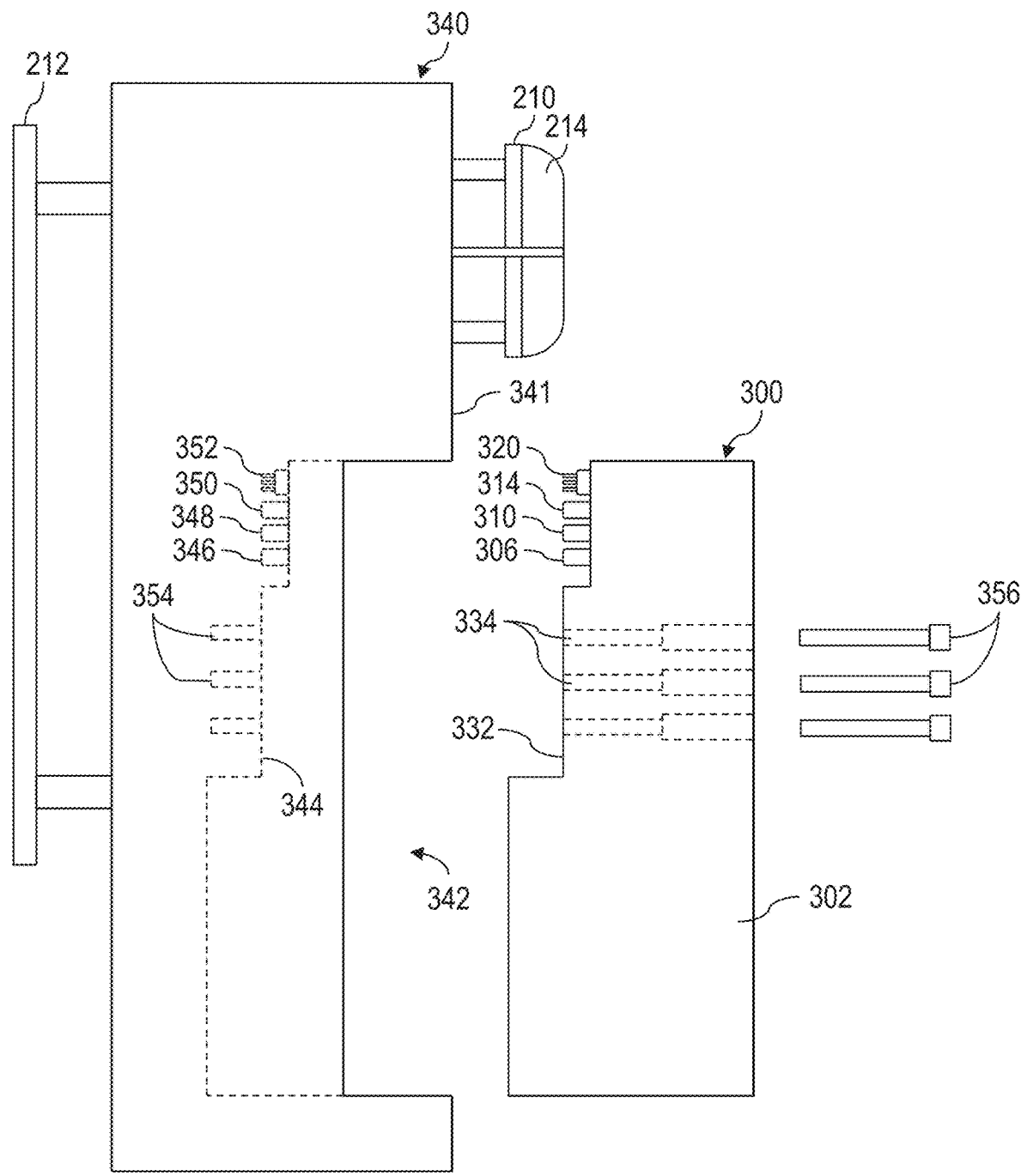
FIG. 5 is an exploded sectional view of at least a portion of an example implementation of apparatus according to one or more aspects of the present disclosure.

FIG. 5 is an exploded sectional view of the pressure testing module 300 shown in FIGS. 3 and 4 and a tool base 340, which may correspond to the tool base 204 shown in FIG. 2, according to one or more aspects of the present disclosure. The tool base 340 may comprise one or more similar features of the tool base 204 as described below.

The fluid connectors 306, 310, 314 and electrical connector 320 may be grouped together or in close proximity to each other at a connection area 326 and may be operable to connect with corresponding fluid connectors 346, 348, 350 and electrical connector 352 of the tool base 340. Although the fluid connectors 306, 310, 314 and electrical connector 320 are shown as male connectors operable to mate with corresponding fluid connectors 346, 348, 350 and electrical connector 352 of the tool base 340, which are female connectors, the fluid connectors 306, 310, 314 and electrical connector 320 may be implemented as female connectors operable to mate with corresponding male connectors of the tool base 340.

The tool base 340 may comprise a cavity 342 along or extending into a side 341 of the tool base 340. The cavity 342 may be adapted to accommodate therein the pressure testing module 300, such as may permit fluid and electrical connection between the tool base 340 and the pressure testing module 300. When the pressure testing module 300 is fully inserted into the cavity 342, a mounting surface 332 of the pressure testing module 300 contacts a corresponding mounting surface 344 of the tool base 340. When the mounting surfaces 332, 344 are in contact, the fluid connectors 306, 310, 314 and electrical connector 320 of the pressure testing module 300 properly engage the corresponding fluid connectors 346, 348, 350 and electrical connector 352 of the tool base 340 to facilitate the fluid and electrical connections between the pressure testing module 300 and the tool base 340. As previously described, the pressure testing module 300 may further comprise a plurality of openings 334 extending laterally through the module body 302 to the mounting surface 332 of the pressure testing module 300. The tool base 340 may comprise a plurality of corresponding threaded openings 354 (e.g., bolt holes) extending laterally at least partially into the tool base 340 through the mounting surface 344. A plurality of bolts 356 may be inserted through the openings 334 and threadedly engaged with the threaded openings 354 to fixedly maintain the pressure testing module 300 in connection with the tool base 340. Other mechanisms for securing the pressure testing module 300 to the tool base 340 may be used instead of or in addition to the bolts 356 and openings 334, 354.

As described above, the pressure testing module 202, 300 within the scope of the present disclosure may be selectively disconnected and removed from the tool base 204, 340 and replaced with another pressure testing module 202, 300 while maintaining the same tool base 204, 340. The pressure testing module 202, 300 may be selected based on operational parameters of the formation fluid testing tool 200 and/or downhole conditions within the wellbore 102. The downhole conditions may include, for example, a differential between the wellbore pressure and the formation pressure, which may control the ratio between the piston diameter 243 of the larger second piston 246 and the piston diameter 245 of the smaller first piston 244. When the formation fluid testing tool 200 is utilized to test a subterranean formation 106 having a lower pressure differential, the pressure testing module 202, 300 may include a first piston 244 having an increased piston diameter 245 (e.g., resulting in a smaller differential between piston diameters 243, 245) slidably disposed within a first chamber portion 238 having a correspondingly increased chamber portion diameter 239. However, when the formation fluid testing tool 200 is utilized to test a subterranean formation 106 having a higher pressure differential, the pressure testing module 202, 300 may include a first piston 244 having a decreased piston diameter 245 (e.g., resulting in a larger differential between piston diameters 243, 245) slidably disposed within a first chamber portion 238 having a decreased chamber portion diameter 239. The increased piston diameter 245 and chamber portion diameter 239 may result in a larger pretest volume of the first chamber portion 238, while the decreased piston diameter 245 and chamber portion diameter 239 may result in a smaller pretest volume of the first chamber portion 238. The relationship between the piston diameter 243 of the larger second piston 246 and the piston diameter 245 of the smaller first piston 244 may be determined by estimated and/or known fluid pressures exerted on the piston assembly 236 as demonstrated by Equation (1).

$$\frac{d_2}{d_1} = \left(1 + \frac{P_{hydrostatic} - P_{formation}}{P_{pump}}\right)^{0.5} \quad (1)$$

where $d_2$ is the piston diameter 243 of the second piston 246, $d_1$ is the piston diameter 245 of the first piston 244, $P_{hydrostatic}$ is the hydrostatic wellbore pressure, $P_{formation}$ is the formation fluid pressure, and $P_{pump}$ is the hydraulic pressure generated by the hydraulic pump 252. Table 1 set forth below lists examples of piston diameters 243, 245 for selected pretest volumes of the first chamber portion 238 and estimated or known maximum differential pressures between the wellbore pressure and the formation pressure.

TABLE 1

| Maximum Differential Pressure (PSI) | Diameter of Piston $d_1$ (Centimeters) | Diameter of Piston $d_2$ (Centimeters) | Total Pretest Volume (Cubic Centimeters) |
|---|---|---|---|
| 10,000 | 3.48 | 6.35 | 85 |
| 15,000 | 3.00 | 6.35 | 63 |
| 20,000 | 2.67 | 6.35 | 50 |

The information in Table 1 shows that as the downhole pressure differential increases and the piston diameter 243 ($d_2$) remains constant, the piston diameter 245 ($d_1$) is decreased to increase the ratio between the piston diameter 243 of the second piston 246 and the piston diameter 245 of the first piston 244 ($d_2/d_1$). The information in Table 1 further shows that as the piston diameter 245 of the first piston 244 ($d_1$) decreases, the pretest volume of the first chamber portion 238 also decreases.

Figure 6:
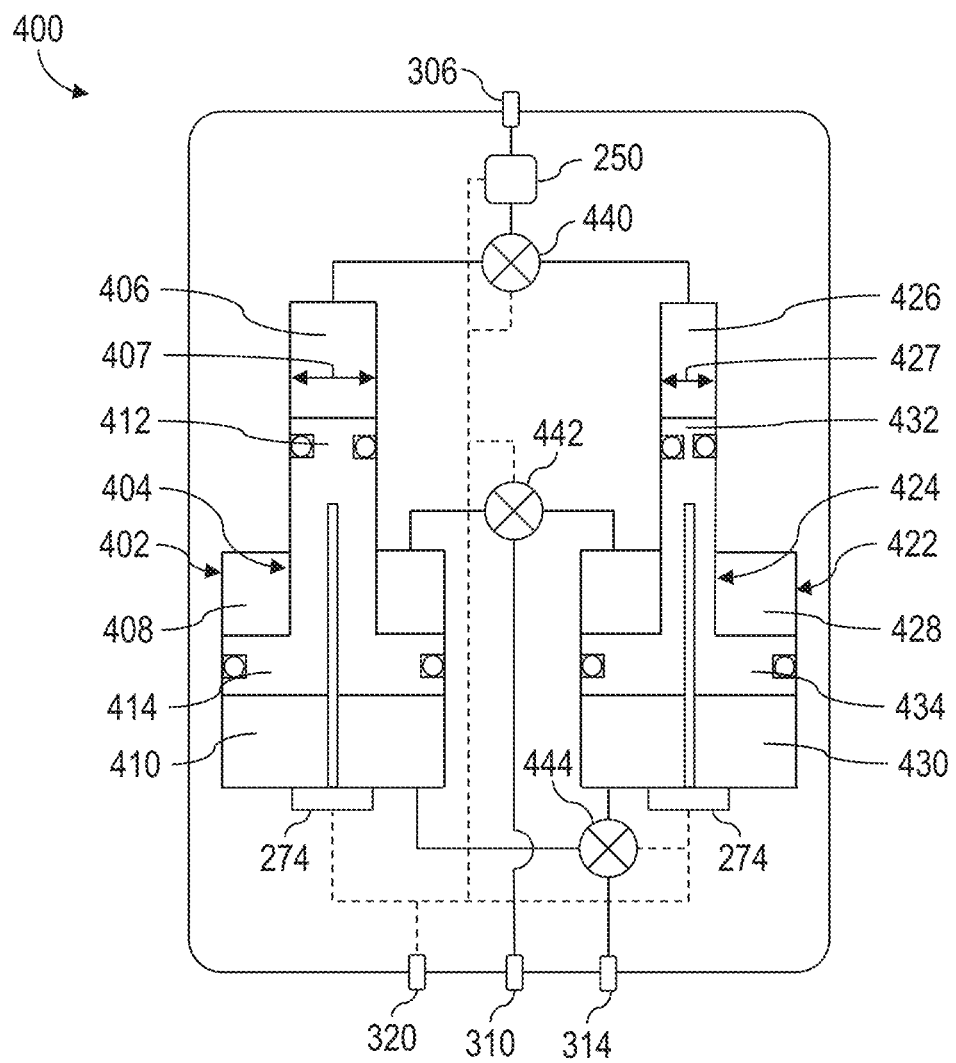
FIG. 6 is a schematic view of at least a portion of an example implementation of apparatus according to one or more aspects of the present disclosure.

In some example implementations, a pressure testing module may also or instead include two or more drawdown chambers and corresponding piston assemblies, wherein each set may be utilized one at a time, such as under different downhole conditions. FIG. 6 is a schematic view of at least a portion of an example implementation of a pressure testing module 400 according to one or more aspects of the present disclosure. The pressure testing module 400 may comprise one or more similar features of the pressure testing modules 202, 300, including where indicated by like reference numbers.

The pressure testing module 400 may comprise a first drawdown chamber 402 containing therein a piston assembly 404 slidably disposed within the first drawdown chamber 402 and dividing the first drawdown chamber 402 into chamber portions 406, 408, 410. The piston assembly 404 may comprise a first piston 412 fluidly dividing the first drawdown chamber 402 into the first chamber portion 406 and second chamber portion 408 and a second piston 414 fluidly isolating the second chamber portion 408 from the third chamber portion 410. The pressure testing module 400 may further comprise a second drawdown chamber 422 containing therein a piston assembly 424 slidably disposed within the second drawdown chamber 422 and dividing the second drawdown chamber 422 into chamber portions 426, 428, 430. The piston assembly 424 may comprise a first piston 432 fluidly dividing the second drawdown chamber 422 into the first chamber portion 426 and the second chamber portion 428 and a second piston 434 fluidly isolating the second chamber portion 428 from the third chamber portion 430.

The first pistons 412, 432 and corresponding first chamber portions 406, 426 may have different diameters, while the second pistons 414, 434 and corresponding third chamber portions 410, 430 may have the same diameter. For example, the first piston 412 of the first drawdown chamber 402 and corresponding first chamber portion 406 may have a diameter 407 that is larger than the diameter 427 of the first piston 432 of the second drawdown chamber 422 and corresponding first chamber portion 426. Accordingly, the maximum pretest volume of the first chamber portion 406 of the first drawdown chamber 402 may be larger than the maximum pretest volume of the first chamber portion 426 of the second drawdown chamber 422.

Each of the first chamber portions 406, 426 may be fluidly connected with a fluid connector 306, such as may permit fluid connection with the corresponding fluid connector 346 of the tool base 340. A fluid valve 440 may be fluidly connected between the fluid connector 306 and the first chamber portions 406, 426 and may be operable to selectively permit fluid communication between the fluid connector 306 and one of the first chamber portions 406, 426. Furthermore, each of the second chamber portions 408, 428 may be fluidly connected with a fluid connector 310, such as may permit fluid connection with the corresponding fluid connector 348 of the tool base 340. A fluid valve 442 may be fluidly connected between the fluid connector 310 and the second chamber portions 408, 428 and may be operable to selectively permit fluid communication between the fluid connector 310 and one of the second chamber portions 408, 428. Each of the third chamber portion 410, 430 may also be fluidly connected with a fluid connector 314, such as may permit fluid connection with the corresponding fluid connector 350 of the tool base 340. A fluid valve 444 may be fluidly connected between the fluid connector 314 and the third chamber portions 410, 430 and may be operable to selectively permit fluid communication between the fluid connector 314 and one of the third chamber portions 410, 430. The fluid valves 440, 442, 444 may be or comprise fluid directional control valves and may be actuated remotely by corresponding actuators (not shown), such as solenoids, motors, or other electric actuators, or fluid actuators, such as hydraulic cylinders or rotary actuators.

Each of the piston assemblies 404, 424 may have a corresponding position sensor 274 operable to generate a signal or information indicative of the axial position and/or velocity of the corresponding piston assembly 404, 424. The position sensors 274, the fluid valves 440, 442, 444, and the fluid sensing unit 250 may be electrically connected with an electrical connector 320, such as may facilitate electrical connection with the corresponding electrical connector 352 of the tool base 340.

Similar to as described above, the pressure testing module 400 may be utilized to perform pressure testing operations to determine and/or monitor the pressure of the formation fluid within the subterranean formation 106. For example, once a fluid seal is achieved between the probe assembly 210 and the sidewall 104 and, perhaps, after the clean-up operation is performed, the selected one of the piston assemblies 404, 424 (e.g., by operation of the fluid valves 440, 442, 444) may be retracted within the corresponding drawdown chamber 402, 422 to form or increase the volume of the corresponding first chamber portion 406, 426 to create a pressure drop in the first chamber portion 406, 426 and the fluid conduit 222, 234 below the formation pressure to draw the formation fluid into the first chamber portion 406, 426 and monitor the formation fluid pressure via the fluid sensing unit 248 and/or the fluid sensing unit 250. The piston assembly 404, 424 and drawdown chamber 402, 422 set utilized to perform the pressure testing operations may be selected based on the intended pretest volume of formation fluid and/or the downhole properties of the wellbore 102, such as the differential between the wellbore pressure and the formation pressure. For example, if a larger pretest volume is to be used, then the first drawdown chamber 402 with the larger piston assembly 404 may be utilized. If the differential between wellbore pressure and formation pressure is relatively large, then the second drawdown chamber 422 with the smaller piston assembly 424 may be utilized. However, if the differential between wellbore pressure and formation pressure is relatively small, then the first drawdown chamber 402 with the larger piston assembly 404 may be utilized.

Although the pressure testing module 400 has been described as being removable from a tool base, such as the tool base 204, 340, components of the pressure testing module 400 may be integral to a tool that is capable of being included in a downhole tool string, such as the downhole tool string 110 in other example implementations, according to one or more aspects of the present disclosure.

Figure 7:
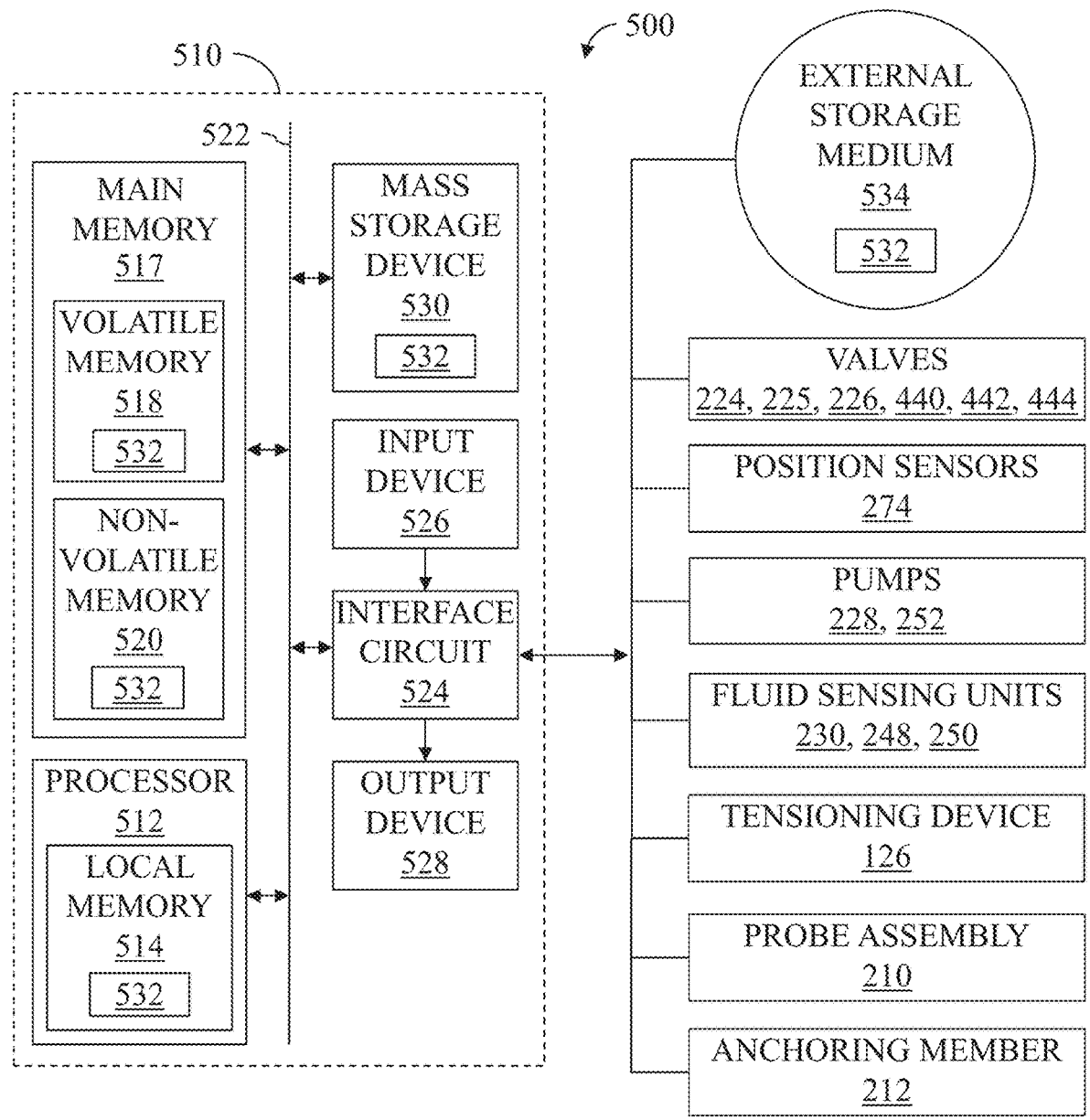
FIG. 7 is a schematic view of at least a portion of an example implementation of apparatus according to one or more aspects of the present disclosure.

Various portions of the apparatuses described above and shown in FIGS. 1-6 may collectively form and/or be controlled by a control system, such as may be operable to monitor and/or control at least some operations of the wellsite system 100, including operations of the downhole tool string 110 and the formation fluid testing tool 160, 200. FIG. 7 is a schematic view of at least a portion of an example implementation of such a control system 500 according to one or more aspects of the present disclosure. The following description refers to one or more of FIGS. 1-7.

The control system 500 may comprise a controller 510, which may be in communication with various portions of the wellsite system 100, including the tensioning device 126 and the various tools of the downhole tool string 110 described within the scope of the present disclosure. For example, the controller 510 may be in signal communication with the tensioning device 126, the probe assembly 210, the anchoring member 212, the fluid valves 224, 225, 226, 440, 442, 444, the position sensors 274, the pumps 228, 252, and the fluid sensing units 230, 248, 250, and/or other actuators and sensors of the wellsite system 100 and the downhole tool string 110. For clarity, these and other components in communication with the controller 510 will be collectively referred to hereinafter as "sensor and operated equipment." The controller 510 may be operable to receive coded instructions 532 from the human operator and signals generated by the position sensors 274 and the fluid sensing units 230, 248, 250, process the coded instructions 532 and the signals, and communicate control signals to the fluid valves 224, 225, 226, 440, 442, 444, the pumps 228, 252, the tensioning device 126, the probe assembly 210, and/or the anchoring member 212 to execute the coded instructions 532 to implement at least a portion of one or more example methods and/or processes described herein, and/or to implement at least a portion of one or more of the example systems described herein. The controller 510 may be or comprise one or more of the uphole processing system 122 and/or the downhole processing system 132 described above.

The controller 510 may be or comprise, for example, one or more processors, special-purpose computing devices, servers, personal computers (e.g., desktop, laptop, and/or tablet computers) personal digital assistant (PDA) devices, smartphones, internet appliances, and/or other types of computing devices. The controller 510 may comprise a processor 512, such as a general-purpose programmable processor. The processor 512 may comprise a local memory 514, and may execute coded instructions 532 present in the local memory 514 and/or another memory device. The processor 512 may execute, among other things, the machine-readable coded instructions 532 and/or other instructions and/or programs to implement the example methods and/or processes described herein. The programs stored in the local memory 514 may include program instructions or computer program code that, when executed by an associated processor, facilitate the wellsite system 100 and the downhole tool string 110 to perform the example methods and/or processes described herein. The processor 512 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Of course, other processors from other families are also appropriate.

The processor 512 may be in communication with a main memory 517, such as may include a volatile memory 518 and a non-volatile memory 520, perhaps via a bus 522 and/or other communication means. The volatile memory 518 may be, comprise, or be implemented by a tangible, non-transitory storage medium, such as random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 520 may be, comprise, or be implemented by a tangible, non-transitory storage medium, such as read-only memory, flash memory, and/or other types of memory devices. One or more memory controllers (not shown) may control access to the volatile memory 518 and/or non-volatile memory 520.

The controller 510 may also comprise an interface circuit 524. The interface circuit 524 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 524 may also comprise a graphics driver card. The interface circuit 524 may also comprise a communication device, such as a modem or network interface card to facilitate exchange of data with external computing devices via a network (e.g., Ethernet connection, digital subscriber line (DSL), telephone line, coaxial cable, cellular telephone system, satellite, etc.). One or more of the sensor and operated equipment may be connected with the controller 510 via the interface circuit 524, such as may facilitate communication between the sensor and operated equipment and the controller 510.

One or more input devices 526 may also be connected to the interface circuit 524. The input devices 526 may permit the human operators to enter the coded instructions 532, including control commands, operational set-points, and/or other data for use by the processor 512. The operational set-points may include, as non-limiting examples, a stop position within the wellbore 102 to which the tensioning device 126 conveys the formation fluid testing tool 160, 200, test positions distributed longitudinally along the wellbore 102 at which the formation fluid testing tool 160, 200 is to perform the pressure testing operations, and/or longitudinal distances between the test positions. The input devices 526 may be, comprise, or be implemented by a keyboard, a mouse, a touchscreen, a track-pad, a trackball, an isopoint, and/or a voice recognition system, among other examples.

One or more output devices 528 may also be connected to the interface circuit 524. The output devices 528 may be, comprise, or be implemented by display devices (e.g., a liquid crystal display (LCD), a light-emitting diode (LED) display, or cathode ray tube (CRT) display), printers, and/or speakers, among other examples. The controller 510 may also communicate with one or more mass storage devices 530 and/or a removable storage medium 534, such as may be or include floppy disk drives, hard drive disks, compact disk (CD) drives, digital versatile disk (DVD) drives, and/or USB and/or other flash drives, among other examples.

The coded instructions 532 may be stored in the mass storage device 530, the main memory 517, the local memory 514, and/or the removable storage medium 534. Thus, the controller 510 may be implemented in accordance with hardware (perhaps implemented in one or more chips including an integrated circuit, such as an ASIC), or may be implemented as software or firmware for execution by the processor 512. In the case of firmware or software, the implementation may be provided as a computer program product including a non-transitory, computer-readable medium or storage structure embodying computer program code (e.g., software or firmware) thereon for execution by the processor 512.

The coded instructions 532 may include program instructions or computer program code that, when executed by the processor 512, may cause the wellsite system 100, including the downhole tool string 110 to perform methods, processes, and/or routines described herein. For example, the controller 510 may receive, process, and record the operational set-points entered by the human operator and the signals generated by the position sensors 274 and the fluid sensing units 230, 248, 250. Based on the received operational set-points and the generated signals, the controller 510 may send control signals or information to the fluid valves 224, 225, 226, 440, 442, 444, the pumps 228, 252, the tensioning device 126, the probe assembly 210, and/or the anchoring member 212, and/or other portions of the downhole tool string 110 and/or the tensioning device 126 to automatically perform and/or undergo one or more operations or routines described herein or otherwise within the scope of the present disclosure.

Figure 8:
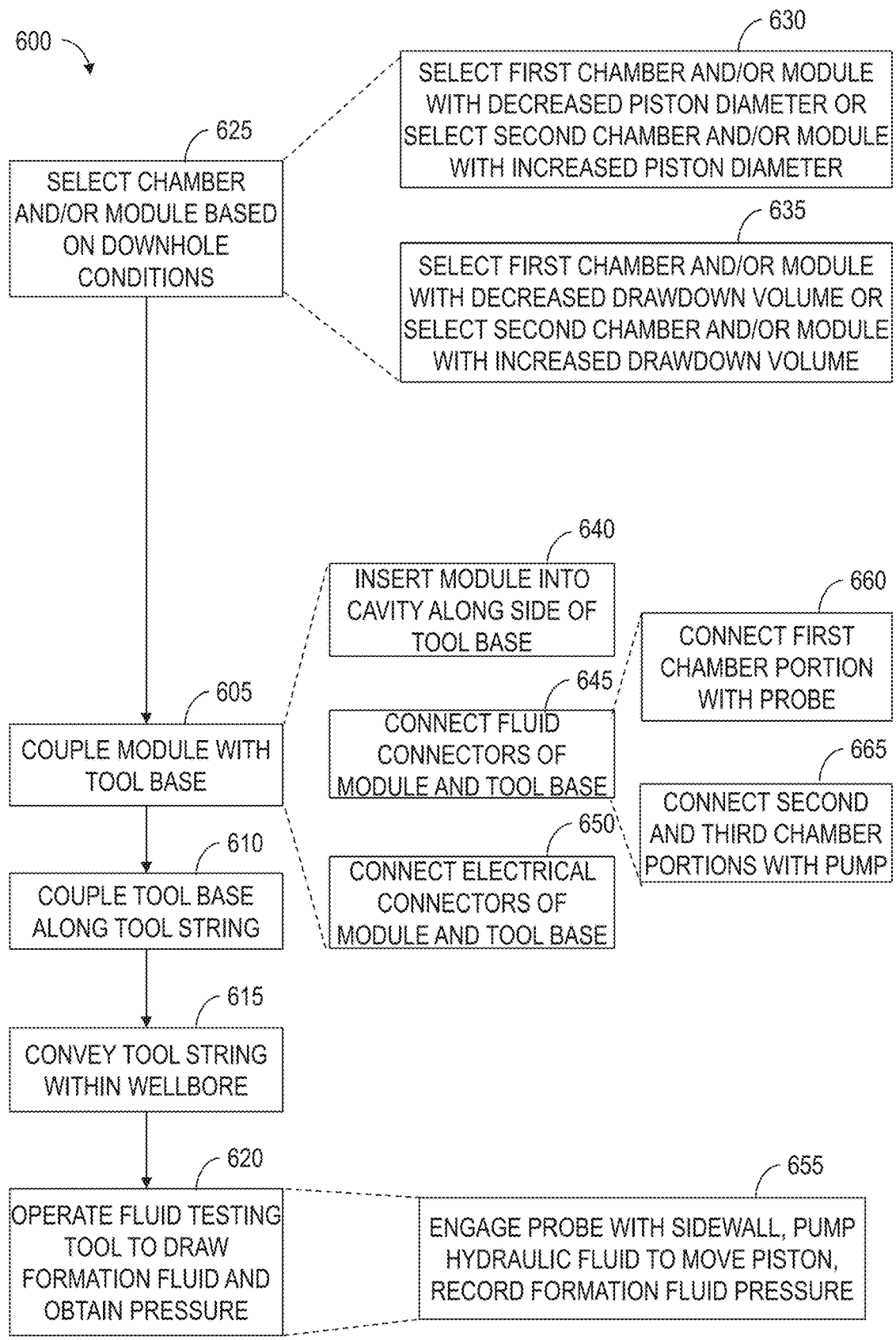
FIG. 8 is a flow-chart diagram of at least a portion of an example implementation of a method according to one or more aspects of the present disclosure.

FIG. 8 is a flow-chart diagram of at least a portion of an example implementation of a method (600) according to one or more aspects of the present disclosure. The method (600) may be performed utilizing or otherwise in conjunction with at least a portion of one or more implementations of one or more instances of the apparatuses shown in one or more of FIGS. 1-7 and/or otherwise within the scope of the present disclosure. The method (600) may be performed manually by the human operator and/or performed or caused, at least partially, by the controller 510 executing the coded instructions 532 according to one or more aspects of the present disclosure. Thus, the following description of the method (600) also refers to apparatuses shown in one or more of FIGS. 1-7. However, the method (600) may also be performed in conjunction with implementations of one or more apparatuses other than those depicted in FIGS. 1-7 that are also within the scope of the present disclosure.

The method (600) includes coupling (605) a pressure testing module (e.g., pressure testing module 202, 300, 400) with a tool base (e.g., tool base 204, 340) to assemble a formation fluid testing tool (e.g., formation fluid testing tool 160, 200), coupling (610) the tool base along a downhole tool string (e.g., downhole tool string 110) to couple the formation fluid testing tool along the downhole tool string, conveying (615) the downhole tool string within a wellbore (e.g., wellbore 102) at a wellsite surface, and operating (620) the formation fluid testing tool to draw formation fluid into the pressure testing module and obtain a pressure of the formation fluid.

Prior to and/or after coupling (605) the pressure testing module with the tool base, the method (600) may also include selecting (625) the drawdown chamber and/or pressure testing module from a plurality of drawdown chambers and/or pressure testing modules based on downhole conditions within the wellbore. One of various pressure testing modules, such as with different configurations of drawdown chambers, can be selected to be coupled with the tool base in some examples. Instead of or in addition to the selection of a pressure testing module, a utilized pressure testing module can include multiple drawdown chambers having different configurations, such as illustrated in FIG. 6, and one of the multiple drawdown chambers in the utilized pressure testing module may be selected by operation of various valves controlled by a controller during or before the operating (620), for example. The downhole conditions may include a differential between the wellbore pressure and the formation pressure. Furthermore, each of the plurality of pressure testing modules may comprise a different configuration adapted to operate under a different downhole condition.

Selecting (625) the drawdown chamber and/or pressure testing module from the plurality of drawdown chambers and/or pressure testing modules based on the downhole conditions within the wellbore may include selecting (630) a first drawdown chamber and/or pressure testing module comprising a piston assembly with a first piston having a smaller or decreased diameter when a differential between the wellbore pressure and the formation pressure is larger, or selecting a second drawdown chamber and/or pressure testing module comprising a piston assembly with a first piston having a larger or increased diameter when the differential between the wellbore pressure and the formation pressure is smaller.

Selecting (625) the drawdown chamber and/or pressure testing module from the plurality of drawdown chambers and/or pressure testing modules based on the downhole conditions within the wellbore may also include selecting (635) a first drawdown chamber and/or pressure testing module comprising a larger or increased drawdown volume of the first chamber portion of the drawdown chamber when a differential between wellbore pressure and formation pressure is smaller, and selecting a second drawdown chamber and/or pressure testing module comprising a smaller or decreased drawdown volume of the first chamber portion of the drawdown chamber when the differential between the wellbore pressure and the formation pressure is larger.

Coupling (605) the pressure testing module with the tool base may be performed while the tool base is coupled along the downhole tool string. Coupling (605) the pressure testing module with the tool base may include inserting (640) the pressure testing module into a cavity (e.g., cavity 342) located along a side (e.g., side 341) of the tool base. Coupling (605) the pressure testing module with the tool base may further comprise connecting (645) fluid connectors (e.g., fluid connectors 272) of the pressure testing module with corresponding fluid connectors (e.g., fluid connectors 270) of the tool base. The fluid connectors of the pressure testing module and the tool base may comprise male stabbers and female receptacles. Coupling (605) the pressure testing module with the tool base may also comprise connecting (650) an electrical connector (e.g., electrical connector 282) of the pressure testing module with a corresponding electrical connector (e.g., electrical connector 280) of the tool base. The electrical connectors of the pressure testing module and the tool base may comprise a male stabber and a female receptacle.

The tool base may comprise a probe assembly (e.g., probe assembly 210) and a hydraulic pump (e.g., hydraulic pump 252). The pressure testing module may comprise a drawdown chamber (e.g., drawdown chamber 232) and a piston assembly (e.g., piston assembly 236) slidably disposed within the drawdown chamber. The piston assembly may comprise a first piston (e.g., first piston 244) dividing the drawdown chamber into a first chamber portion (e.g., first chamber portion 238) and a second chamber portion (e.g., second chamber portion 240) and may comprise a second piston (e.g., second piston 246) fluidly isolating the second chamber portion from a third chamber portion (e.g., third chamber portion 242). Hence, connecting (645) the fluid connectors of the pressure testing module with the fluid connectors of the tool base may further comprise fluidly connecting (660) the first chamber portion with the probe assembly and fluidly connecting (665) the second chamber portion and the third chamber portion with the hydraulic pump.

Operating (620) the formation fluid testing tool may include engaging (655) the probe assembly with a sidewall of the wellbore, pumping hydraulic fluid into the second chamber portion to move the piston assembly to draw the formation fluid from the sidewall into the first chamber portion, and recording the pressure of the formation fluid within the first chamber portion.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus comprising:
   a fluid testing tool configured to be coupled along a downhole tool string to convey within a wellbore extending into a subterranean formation, wherein the fluid testing tool comprises:
     a tool base configured to be coupled along the downhole tool string, wherein the tool base comprises:
       a hydraulic pump; and
       a probe assembly operable to engage a sidewall of the wellbore and receive formation fluid from the subterranean formation; and
     a pressure testing module separable from and configured to be coupled with the tool base, wherein the pressure testing module comprises:
       a chamber having a first chamber portion and a second chamber portion, wherein the hydraulic pump is fluidly connected to a first chamber portion and is operable to pump hydraulic fluid into the first chamber portion causing the formation fluid to be drawn into the second chamber portion.

2. The apparatus of claim 1 wherein the pressure testing module comprises an electrical connector operable to electrically connect with a corresponding electrical connector of the tool base to electrically connect the pressure testing module with the tool base.

3. The apparatus of claim 1 wherein:
   a first piston assembly disposed in the chamber;
   the apparatus further comprises a second piston assembly slidably disposed within another chamber;
   the first piston assembly comprises a piston having a first diameter;
   the second piston assembly comprises a piston having a second diameter;
   the first diameter is larger than the second diameter; and
   the pressure testing module is operable to select one of the chamber with the first piston assembly and the other chamber with the second piston assembly to which the hydraulic fluid and the formation fluid is conveyed.

4. The apparatus of claim 1 wherein the fluid testing tool comprises a formation fluid sampling tool.

5. The apparatus of claim 1 further comprising a controller comprising a processor and a memory storing computer program code, wherein the controller is in signal communication with and operable to control the fluid testing tool.

6. The apparatus of claim 1 wherein the tool base further comprises a volume of hydraulic fluid fluidly connected with the hydraulic pump, wherein the tool base is operable to pressure compensate the hydraulic fluid.

7. The apparatus of claim 1 wherein the tool base further comprises a pressure sensor in fluid communication with the second chamber portion and operable to generate a signal indicative of pressure of the formation fluid within the second chamber portion.

8. The apparatus of claim 1 wherein the tool base further comprises a hydraulic valve fluidly connected between the hydraulic pump and the first chamber portion.

9. The apparatus of claim 1 wherein at least one piston assembly is located in the chamber and is configured to draw the formation fluid into the second chamber portion when hydraulic fluid is pumped into the first chamber portion, and wherein a position sensor is disposed in association with at least one of the piston assemblies and operable to generate a signal indicative of a position of at least one of the piston assemblies within the chamber.

10. The apparatus of claim 1 wherein the pressure testing module further comprises a pressure sensor in fluid communication with the second chamber portion and operable to generate a signal indicative of pressure of the formation fluid within the second chamber portion.

11. The apparatus of claim 1 wherein the pressure testing module is operable to be coupled with the tool base while the tool base is coupled along the downhole tool string.

12. The apparatus of claim 1 wherein the tool base comprises a cavity along a side of the tool base, and wherein the cavity is adapted to accommodate therein the pressure testing module.

13. The apparatus of claim 1 wherein the pressure testing module comprises fluid connectors operable to fluidly connect with corresponding fluid connectors of the tool base to fluidly connect the pressure testing module with the tool base.

14. The apparatus of claim 13 wherein the fluid connectors of the pressure testing module comprise male stabbers, and the fluid connectors of the tool base comprise female receptacles.

15. The apparatus of claim 13 wherein the pressure testing module further comprises:
   a first bore fluidly connecting the first chamber portion with a first one of the fluid connectors of the pressure testing module; and
   a second bore fluidly connecting the second chamber portion with a second one of the fluid connectors of the pressure testing module.

16. The apparatus of claim 15 wherein at least one piston assembly further divides the chamber into a third chamber portion, and wherein the pressure testing module further comprises a third bore fluidly connecting the third chamber portion with a third one of the fluid connectors of the pressure testing module.

17. An apparatus comprising:
a pressure testing module comprising:
  a first chamber divided into a first chamber portion and a second chamber portion; and
  a second chamber divided into a third chamber portion and a fourth chamber portion; and
a tool base configured to be coupled along a downhole tool string to be conveyed within a wellbore extending into a subterranean formation, wherein:
  the pressure testing module is separable from and coupled to the tool base; and
  the tool base comprises:
    a probe assembly operable to engage a sidewall of the wellbore and receive formation fluid from the subterranean formation; and
    a hydraulic pump operable to pump hydraulic fluid; and
wherein the pressure testing module and the tool base are operable to selectively convey the hydraulic fluid pumped by the hydraulic pump (i) into the first chamber portion to draw the formation fluid into the second chamber portion or (ii) into the third chamber portion to draw the formation fluid into the fourth chamber portion, or combinations thereof.

18. The apparatus of claim 17 wherein the selective conveyance of the hydraulic fluid is based on downhole conditions within the wellbore.

19. The apparatus of claim 17 wherein the first chamber is divided into a first chamber portion and a second chamber portion by a first piston assembly, and wherein the first piston assembly comprises a piston having a first diameter, wherein the second chamber has a second piston assembly dividing the second chamber into the third chamber portion and the fourth chamber potions, and wherein the second piston assembly comprises a piston having a second diameter, and wherein the first diameter is larger than the second diameter.

20. The apparatus of claim 19 wherein the pressure testing module further comprises:
a first pressure sensor in fluid communication with the second chamber portion and operable to generate a signal indicative of pressure of the formation fluid within the second chamber portion; and
a second pressure sensor in fluid communication with the fourth chamber portion and operable to generate a signal indicative of pressure of the formation fluid within the fourth chamber portion.

* * * * *